United States Patent

Kosaka et al.

[11] 4,064,085
[45] Dec. 20, 1977

[54] PROCESS FOR PRODUCING CATIONIC LATEXES

[75] Inventors: Yujiro Kosaka; Hideaki Nakazawa, both of Yokohama; Tetsuo Iikuni; Mitsumasa Akashi, both of Shinnanyo, all of Japan

[73] Assignee: Toyo Soda Manufacturing Co., Ltd., Shinnanyo, Japan

[21] Appl. No.: 629,445

[22] Filed: Nov. 6, 1975

[30] Foreign Application Priority Data

Nov. 6, 1974 Japan .................................. 49-127059

[51] Int. Cl.$^2$ ................................................. C08L 9/10
[52] U.S. Cl. ............................ 260/29.7 R; 260/29.7 M; 260/29.7 N
[58] Field of Search ................. 260/29.7 M, 29.7 N, 260/29.7 R, 583 P

[56] References Cited

U.S. PATENT DOCUMENTS

| | | | |
|---|---|---|---|
| 2,700,686 | 1/1955 | Dickey et al. | 260/584 |
| 2,887,460 | 5/1959 | Dibert et al. | 260/29.7 M |
| 3,660,324 | 5/1972 | Onchi et al. | 260/29.7 N |
| 3,905,932 | 9/1975 | Nakazawa et al. | 260/29.7 N |
| 3,954,873 | 5/1976 | Gipson | 260/583 P |

OTHER PUBLICATIONS

Zasshi, J. of the Chemical Society of Japan, Industrial Chem. Section, vol. 68, No. 5, 1965, pp. 956–960.

*Primary Examiner*—M. J. Welsh

*Attorney, Agent, or Firm*—Sughrue, Rothwell, Mion, Zinn and Macpeak

[57] ABSTRACT

A process for producing cationic synthetic rubber latexes by the emulsion polymerization of a conjugated diene or a conjugated diene and a comonomer copolymerizable with the conjugated diene, wherein the polymerization is carried out in the presence of a cationic emulsifier consisting of one or more organic or inorganic acid salts of a β-hydroxy- or β-hydroxymethyl-alkylpolyamine of the general formulae:

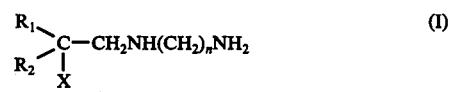

or

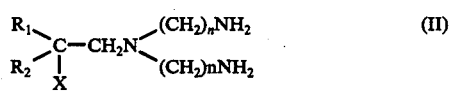

wherein X is a hydroxyl or hydroxymethyl group, $R_1$ is a hydrogen atom or an alkyl group of 1 to 20 carbon atoms, $R_2$ is a hydrogen atom or an alkyl group of 1 to 20 carbon atoms, $R_1 + R_2$ together contain 8 to 20 carbon atoms, and $n$ is an integer of 1 to 3, an ethylene oxide and/or propylene oxide adduct thereof, or an organic or inorganic acid salt of such an adduct, or a mixture thereof, and in the presence of colloidal alumina.

6 Claims, 2 Drawing Figures

PROCESS FOR PRODUCING CATIONIC LATEXES

BACKGROUND OF THE INVENTION

1. Field of the Invention

The present invention relates to a process for producing cationic synthetic rubber latexes.

2. Description of the Prior Art

Most conventional synthetic rubber latexes are produced using anionic or non-ionic emulsion polymerization systems. They are devoid of oriented adsorbency to polyvalent metal ions, cement, glass, metals, aggregates, etc., and thus cannot be used to modify cement, to rubberize asphalt, or for adhesion to inorganic materials or to form films on metal surfaces.

As cationic latexes, polychloroprene latexes are now commercially available, but the emulsifier used to produce the same comprises a quaternary ammonium salt which renders the emulsion so stable that products formed therefrom do not easily solidify. Accordingly, when products containing such emulsion are applied, for example, to the surface of an inorganic material, e.g., to an aggregate or a metal, they must be force dried using heat or subjected to conventional evaporation for long periods of time. These latexes have the further drawback that the emulsifiers remain stable in a rubber film formed therefrom to adversely affect water-resistance and chemical resistance of such a film.

As a process for producing cationic rubber latexes, it has been proposed to add cationic emulsifiers to latexes manufactured by anionic or non-ionic polymerization. While the latexes can thus be rendered largely cationic by the use of a large amount of a cationic emulsifier, they still retain a partial anionic or non-ionic character with, accordingly, a partial retention of the disadvantages set forth above.

SUMMARY OF THE INVENTION

After extensive research to overcome the drawbacks of conventional cationic latexes, we have now found that cationic latexes comprising a polymerized diene having improved properties can be obtained by emulsion polymerizing a conjugated diene or a conjugated diene and a comonomer copolymerizable therewith in the presence of an emulsifier comprising:

a. one or more organic or inorganic acid salts of a hydroxy- or hydroxymethyl-alkylpolyamine, an ethylene oxide adduct and/or propylene oxide adduct thereof or an organic or inorganic acid salt of such an oxide adduct, or a mixture thereof, and b. colloidal alumina.

In a more preferred embodiment of the present invention there is provided a process for producing cationic latexes by the emulsion polymerization of a conjugated diene or a conjugated diene and a comonomer copolymerizable therewith, where the polymerization is carried out in the presence of a cationic emulsifier comprising:

a. one or more organic or inorganic acid salts of a β-hydroxy- or β-hydroxymethyl-alkylpolyamine of the general formulae:

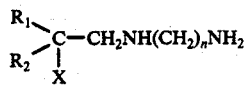

(I)

or

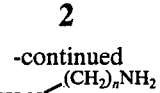

(II)

wherein X is a hydroxyl or hydroxymethyl group, $R_1$ is a hydrogen atom or an alkyl group of 1 to 20 carbon atoms, $R_2$ is a hydrogen atom or an alkyl group of 1 to 20 carbon atoms, the total of the carbon atoms in $R_1 + R_2$ is 8 to 20, and $n$ is an integer of 1 to 3, and an ethylene oxide and/or propylene oxide adduct thereof or an organic or inorganic acid salt of such an oxide adduct, or a mixture thereof; and b. colloidal alumina.

Examples of suitable organic acids used to form such a salt include aliphatic carboxylic acids, e.g., formic acid, acetic acid, propionic acid and oxalic acid; and examples of suitable inorganic acids include hydrochloric acid, sulfuric acid and phosphoric acid; with hydrochloric acid and acetic acid being preferred.

DETAILED DESCRIPTION OF THE INVENTION

Figure 1:
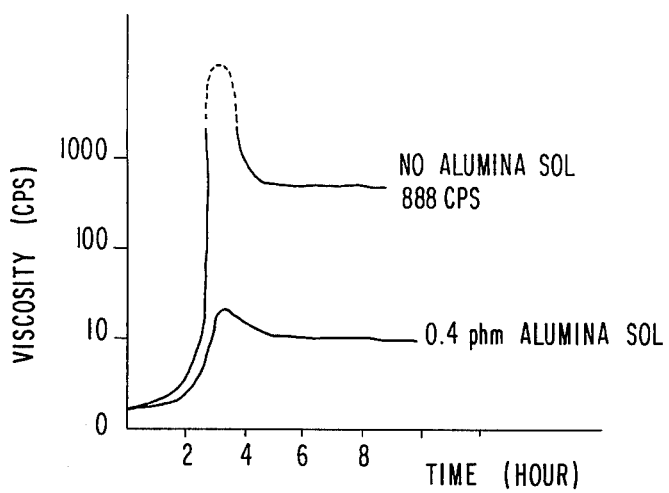
FIGS. 1 and 2 illustrate the relationship between reaction time and the viscosity increase during emulsion polymerization according to one embodiments of the invention.

Most preferred cationic emulsifiers used in the present invention are those of the above general formulae (I) and (II) wherein the sum of the carbon atoms in $R_1 + R_2 = 10$ to 18.

The cationic emulsifiers of the present invention can be prepared by conventional mehtods, for example, by adding an amino compound such as ethylene diamine to an alpha-olefin epoxide as disclosed in Kogyo Kagaku Zasshi 68, No. 5, 957–960 (1965). They can also be obtained according to the method described in the U.S. Pat. No. 3,028,415, i.e., by adding ammonia to an alpha-olefin epoxide, followed by adding acrylonitrile, and thereafter hydrogenating with a reduction catalyst.

The adducts of ethylene oxide or propylene oxide used in the invention are formed in a conventional fashion, and usually the molar ratio of ethylene oxide or propylene oxide to the alkylpolyamine is within the conventional range of from above 0 to 5 mols, preferably from above 0 to 3 mols, of oxide per mole of alkylpolyamine.

The organic or inorganic acid salts of the amines of general formulae (I) and (II), the ethylene or propylene oxide adducts thereof, and the organic and inorganic acid salts of such adducts can be used alone or in any combination thereof, if desired. Further, a mixed ethylene oxide/propylene oxide adduct of the amines of general formulae (I) and (II) can replace the ethylene oxide or propylene oxide adducts, if desired, and such can be used alone or in any combination with the above materials.

Conjugated dienes which can be polymerized by the process of this invention include all conventional commercially available conjugated dienes which are amenable to emulsion polymerization; there can be mentioned, for example, butadiene, chloroprene, styrene-butadiene, and isoprene. The comonomers copolymerizable with these diene monomers include all of conventionally used comonomers, for example, 2,3-dichlorobutadiene, styrene, acrylic acid or an acrylic acid ester, and acrylonitrile.

The amount of diene in the polymerization system is set in accordance with conventional art techniques, and proportions of diene as are conventionally used in emulsion polymerizations are selected. Typically, the amount of diene is from about 50 to about 100 wt. %, based on the total weight of the emulsion polymerization system, but this is not a limitative range.

The proportion of comonomer is 0 to 50% by weight, preferably 5 to 20% by weight, of the total monomer weight.

The preferred dimensions of the colloidal alumina particles used in the present invention are 50 – 100 m$\mu$ average length and 5 – 10 m$\mu$ average width. The alumina can be in amorphous, i.e., feather or fibrile form, and dispersed and stabilized with an organic acid, such as a $C_1$–$C_4$ aliphatic acid, e.g., oxalic acid, formic acid, acetic acid, propionic acid or an inorganic acid, such as hydrochloric acid, sulfuric acid, nitric acid, phosphoric acid, etc., preferably hydrochloric acid or acetic acid. Typical examples of the colloidal alumina include alumina sol and baymated granulated alumina. The colloidal alumina can be prepared by adding aluminum powder to an acid solution thereby forming a solution of the aluminum salt. The amount of colloidal alumina used is, as a rule, 0.05 – 5 wt % (calculated in terms of solid $Al_2O_3$) based on the weight of the diene monomer, preferably 0.1 – 1.5 wt %, same basis.

The use of colloidal alumina serves to reduce the amount of the emulsifier used and to control the viscosity increase of the emulsion system upon polymerization, thereby yielding latexes of desirable properties.

The amount of emulsifier is usually 1 to 10 wt %, preferably 2 to 6 wt %, based on the total monomer weight in the system.

Conventional emulsion polymerization conditions usually used in the manufacture of latexes are used in the present invention.

The polymerization pressures is usually atmospheric pressure to 5 atmospheres and the temperature is 0° to 80° C, preferably 10° to 60° C. The polymerization can be carried out using any conventional polymerization catalyst, such as free radical catalysts or redox polymerization catalysts, which are commonly used for emulsion polymerization. Reaction time is not overly important and is in accordance with conventional emulsion polymerization techniques.

The diene latexes obtained according to the present invention have various properties which cannot be expected with conventional latexes, and they can be used for various purposes. For example, their emulsion state is immediately destroyed upon use, so that they can be used as a binder for aggregates used for road pavements, wall or bank water proofing, roofing, floor covering, and the like, and can also be used in spraying cement and concrete. Further, they can easily be solidified by rendering them alkaline, so that they are useful for coating and impregnating fibers, papers and the like.

The following Examples illustrate the invention without limiting its scope. All parts and percentages" refer to parts and percentages by weight.

EXAMPLE 1

100 Parts of chloroprene monomer having 0.33 part of n-dodecylmercaptan dissolved therein was placed in a reaction vessel provided with a reflux condenser, stirrer, and specific gravity measuring device and a nitrogen gas inlet and outlet and 0.03 part of t-butyl hydroperoxide as an oxidation catalyst was added thereto.

125 Parts of an aqueous emulsifier solution containing 3.0 parts of acetic acid required for neutralization and the acetic acid salt of $\beta$-hydroxyalkyl ($C_{14}$–$C_{16}$) ethylenediamine ethylene oxide adduct (amine:oxide (molar ratio) = 1:3; about 40% $C_{14}$, about 55% $C_{16}$, balance $C_{15}$ (molar)) and 0.4 part of alumina sol (10 wt % of solid $Al_2O_3$; balance water plus acetic acid: 50 – 100 m$\mu$ average length; 5 – 10 m$\mu$ average width) were added thereto, while stirring at high speed, to form a chloroprene monomer emulsion. The air in the vessel was then replaced by nitrogen gas and thereafter the temperature elevated to 40° C at atmospheric pressure. Sodium formaldehyde sulfoxylate was dropwise added to the reaction system as a reduction catalyst at a rate of 0.00025 part/hour to initiate polymerization. The progress of the polymerization was followed by the specific gravity measuring device, and the viscosity of the reaction system was measured during conversion. The conversion of the chloroprene monomer reached 98% after 8 hours, and addition of the reduction catalyst was then discontinued. The reaction product was then allowed to cool for 3 hours to mature the system. 0.12% Monomer remained in resulting latex. The maximum viscosity during the reaction was 21 cps, and the viscosity of the final product at room temperature was 11.2 cps.

For comparison, the polymerization of chloroprene was conducted in the same manner as above except for not using the alumina sol. A rapid elevation in viscosity occurred in the course of the reaction that precluded measurement, but the polymerization was forced to proceed by vigorous stirring. The resultant latex had a viscosity of 888 cps. The results are shown in FIG. 1.

EXAMPLE 2

100 Parts of chloroprene monomer containing 0.4 part of n-dodecylmercaptan dissolved therein was placed in a vessel as used in Example 1, and 100 parts of an aqueous emusifier solution containing 3.5 parts of the acetic acid salt of $\beta$-hydroxyalkyl ($C_{14}$–$C_{16}$) ethylenediamine: ethylene oxide adduct (amine:oxide (molar ratio) = 1:3; about 40% $C_{14}$, about 55% $C_{16}$, balance $C_{15}$) and 0.5 part of alumina sol as in Example 1 were added with high speed stirring to obtain a chloroprene monomer emulsion. The emulsion was then heated to 45° C and polymerization carried out as in Example 1 to obtain a polychloroprene latex.

Figure 2:
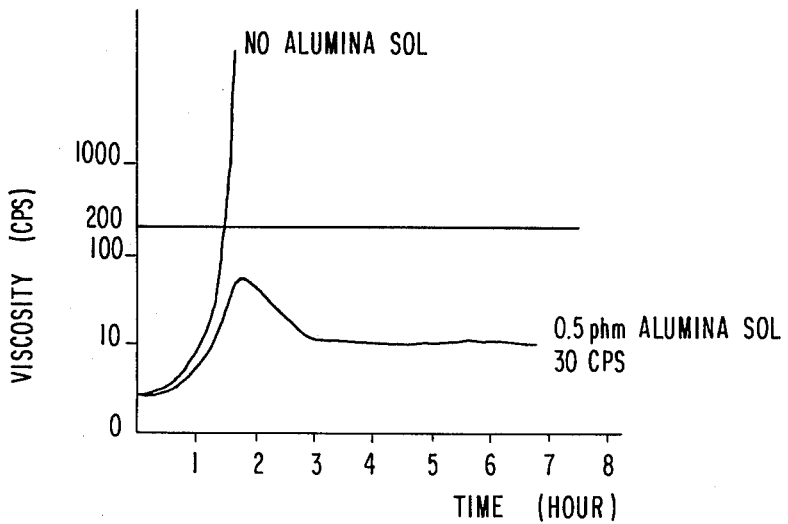

The maximum viscosity in the course of the polymerization was 60 cps (45° C). Removal of the reaction heat was conducted normally and no coagulate formation was observed. The viscosity of the final product was 4 cps. For comparison, the polymerization was carried using the same system as above except for not using the alumina sol. Two hours after the initiation of the polymerization, an extreme elevation in viscosity occurred, which prevented stirring and removal of the heat of reaction, whereupon the reaction was stopped. The results are shown in FIG. 2.

EXAMPLE 3

100 parts of chloroprene monomer containing 0.35 part of n-octylmercaptan dissolved therein were placed in a vessel as was used in Example 1, and 100 parts of an aqueous emulsifier solution containing 4.0 parts the acetic acid salt of $\beta$-hydroxyalkyl ($C_{14}$–$C_{16}$; same molar ratio as in Example 1) ethylenediamine, 0.6 part of alumina sol as in Example 1 and 0.02 g of sodium formaldhyde sulfoxylate (a reducing agent) were added with high speed stirring to obtain a chloroprene monomer emulsion. The emulsion was then heated to 45° C and emulsion polymerization carried out in the same manner as Example 1 while adding 0.0002 parts per hour of tert-butyl hydroxyperoxide as a redox catalyst to the polymerization system to obtain a polychloroprene latex. The maximum viscosity during the course of the polymerization was 80 cps at 40° C and the viscosity of the final product was 15.3 cps at 20° C. No abnormal reaction heat and no coagulate formation were observed in the polymerization.

EXAMPLE 4

72 Parts of butadiene, 28 parts of styrene, 0.28 part of tert-dodecylmercaptan, 3.0 parts of hydrochloric acid salt of $\beta$-hydroxyalkyl ($C_{14}$ to $C_{16}$ alkyl, molar ratio as in Example 1) dipropyltriamine, and 0.5 part of alumina sol as in Example 1 were emulsified in 100 parts of water.

The aqueous emulsifier solution was placed into a vessel as was used in Example 1 and emulsion polymerization carried out by dropwise adding to the emulsion 0.00386 part per hour of $\alpha,\alpha'$-azobis-(isobutylamidinium chloride) at 48° C.

The conversion of butadiene reached 92% after 40 hours, whereafter the addition of 0.2 g of a stopping agent (dimethyl ammonium dimethyldithiocarbamate) terminated the reaction.

The cationic styrene-butadiene copolymer latex was obtained by removing unreacted monomer from the latex. The concentration of the latex was 43%. The maximum viscosity of the reaction system was 150 cps at 45° C, stirring was easy and reaction temperature was normal. Further, no coagulate formation was observed.

For comparison, the polymarization was conducted in the same manner as above except for not using the alumina sol. A rapid elevation in viscosity occurred at 36% conversion and the reaction was stopped because a paste was produced in the reaction vessel which prevented stirring.

While the invention has veen described in detail and with reference to specific embodiments thereof, it will be apparent to one skilled in the art that various changes and modifications can be made therein without departing from the spirit and scope thereof.

What is claimed is:

1. In a process for producing cationic latexes by the emulsion polymerization of a conjugated diene or a conjugated diene plus less than 50% by weight of the total monomer weight of a comonomer copolymerizable with the conjugated diene, the improvement wherein the polymerization is carried out in the presence of a cationic emulsifier comprising:

at least one member selected from the group consisting of a. an organic or inorganic acid or salt as of $\beta$-hydroxyalkylpolyamine or a $\beta$-hydroxymethylalkylpolyamine of the general formula:

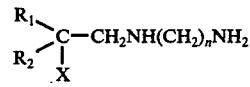

or

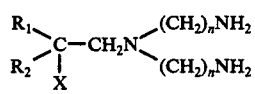

in which X stands for a hydroxyl or hydroxymethyl group, $R_1$ stands for a hydrogen atom or an alkyl group of 1 to 20 carbon atoms, $R_2$ stands for a hydrogen atom or an alkyl group of 1 to 20 carbon atoms, the total sum of the carbon atoms of $R_1 + R_2$ is 8 to 20, and $n$ stands for an integer of 1 to 3;

b. an ethylene oxide adduct, a propylene oxide adduct or an ethylene oxide/propylene oxide adduct of $\beta$-hydroxyalkylpolyamine or $\beta$-hydroxymethylalkylpolyamine; and c. an organic or inorganic acid salt of said oxide adducts; and in the presence of colloidal alumina.

2. The process of claim 1, wherein said conjugated diene is chloroprene.

3. The process of claim 1, wherein said conjugated diene is butadiene and said comonomer is styrene.

4. The process of claim 1, wherein a comonomer is copolymerized with the conjugated diene, said comonomer being selected from the group consisting of 2,3-dichlorobutadiene, styrene, acrylic acid, an acrylic acid ester and acrylonitrile.

5. The process of claim 1, wherein the emulsifier is an inorganic or organic acid salt of a $\beta$-hydroxy ($C_{14}$–$C_{16}$)-alkylethylenediamine-ethylene oxide adduct of up to 5 moles of ethylene oxide per mole of said diamine.

6. The process of claim 1, wherein chloroprene is emulsified with water using the acetic acid salt of a $\beta$-hydroxy-alkylethylenediamine-ethylene oxide adduct as the emulsifier in a concentration of 1 to 10% by weight based on monomer weight, and wherein a peroxide is added to the emulsion and emulsion polymerization is conducted by dropwise adding a reducing agent at 0 to 80° C.

* * * * *